United States Patent [19]

Ingram et al.

[11] Patent Number: 5,337,859

[45] Date of Patent: Aug. 16, 1994

[54] PROCESS GAS COMPRESSOR TRAIN FUGITIVE EMISSIONS RECOVERY SYSTEM

[75] Inventors: Ralph H. Ingram; William L. Green, both of Destrehan, La.

[73] Assignee: Shell Oil Company, Houston, Tex.

[21] Appl. No.: 57,362

[22] Filed: May 5, 1993

[51] Int. Cl.⁵ .................................. F01M 3/00
[52] U.S. Cl. ........................ 184/6.21; 184/6.16; 184/6.4; 184/6
[58] Field of Search ............. 184/6.4, 6.16, 6.27, 184/6, 108, 6.21

[56] References Cited

U.S. PATENT DOCUMENTS

| | | | |
|---|---|---|---|
| 1,553,149 | 9/1925 | Doran | 184/6.21 |
| 3,812,654 | 5/1974 | Brown | 184/6 |
| 3,831,381 | 8/1974 | Swearingen | 184/6 |
| 4,005,580 | 2/1977 | Swearingen | 184/6 |

FOREIGN PATENT DOCUMENTS 535279  2/1955  Belgium ............... 184/6.16
3504356 8/1985  Fed. Rep. of Germany ..... 184/6.16

*Primary Examiner*—Thomas E. Denion

[57] ABSTRACT

A Fugitive Emissions Recovery System (FERS) for a Process Gas Compressor Train recovers all process gas leakage from each PGC case by creating a slight vacuum in the PGC lube oil reservoir, the bearing housings on each compressor case, the PGC lube oil reclaimer, and the PGC sour oil holding tank. This vacuum is accomplished without compromising the over-pressure protection of the aforementioned compressor components and without allowing air leakage into the FERS. All recovered PGC seal leakage is routed to a furnace for combustion. A closed-loop lubrication system is used.

16 Claims, 4 Drawing Sheets

PROCESS GAS COMPRESSOR TRAIN FUGITIVE EMISSIONS RECOVERY SYSTEM

FIELD OF THE INVENTION

This invention relates generally to the recovery of fugitive emissions from rotating equipment and more particularly to the recovery of gas leakage from compressor seals. All recovered gas is routed to furnaces for combustion.

BACKGROUND OF THE INVENTION

Process gas is a hydrocarbon gas which contains benzene, butadiene, and other hydrocarbon compounds. For health and environmental reasons, it is important that this gas not be allowed to escape to the atmosphere. In Assignee's olefins units, a process gas compressor (PGC) is used to compress pyrolysis furnace effluent (process gas) from an inlet pressure of 8 psi to an outlet pressure of 570 psi. The PGC may be, for example, a turbine-driven, 3-case, 4-stage machine. Each compressor case is split horizontally to allow access for maintenance. A closed-loop lubrication system provides lubrication to the turbine and compressor bearings.

The PGC does, however, permit some leakage of process gas to the atmosphere. This leakage occurs because of a combination of factors. Over time and exposure to heat and stress, the mating surfaces of the top and bottom halves of each compressor case may have become non-coplanar resulting in process gas leakage across the splitline. This situation, along with the design of the compressor case, makes it difficult to properly torque all of the case bolts. Further, the case bore and rotor may no longer be perfectly concentric because of distortion from years of thermal and pressure cycles. With the compressor case in this condition, process gas will leak past the compressor seals and into the bearing housings of each compressor case. Inside each bearing housing, the leaking process gas is entrained in the lube oil from the closed-loop lubrication system. After exiting each bearing housing, this entrained mixture of lube oil and process gas is returned to the lube oil reservoir where the lube oil begins its recirculation through the closed-loop lubrication system. Inside the reservoir, the lube oil and process gas separate into liquid and gas phases. Prior to the invention, the process gas escaped to the atmosphere through atmospheric vents in the top of the lube oil reservoir.

Further, as a result of the process gas leakage, it became necessary to utilize a lube oil reclaimer to remove benzene, butadiene, and other contaminants from lube oil exposed to process gas. (Process gas-contaminated lube oil is commonly referred to as "sour lube oil".) The lube oil reclaimer uses a small vacuum flasher to vaporize contaminates and is well known by those skilled in the art of reclaiming contaminated lube oil. Prior to the invention, these vapors were also vented to atmosphere.

SUMMARY OF THE INVENTION

The purpose of the Process Gas Compressor Train Fugitive Emissions Recovery System (FERS) is to recover all process gas leakage from each PGC case by creating a slight vacuum in the PGC lube oil reservoir, the bearing housings on each compressor case, the PGC lube oil reclaimer, and the PGC sour oil holding tank. This vacuum is accomplished without compromising the over-pressure protection of the aforementioned compressor components and without allowing air leakage into the FERS. All recovered PGC seal leakage is routed to a furnace for combustion.

DETAILED DESCRIPTION OF THE INVENTION

Figure 1:
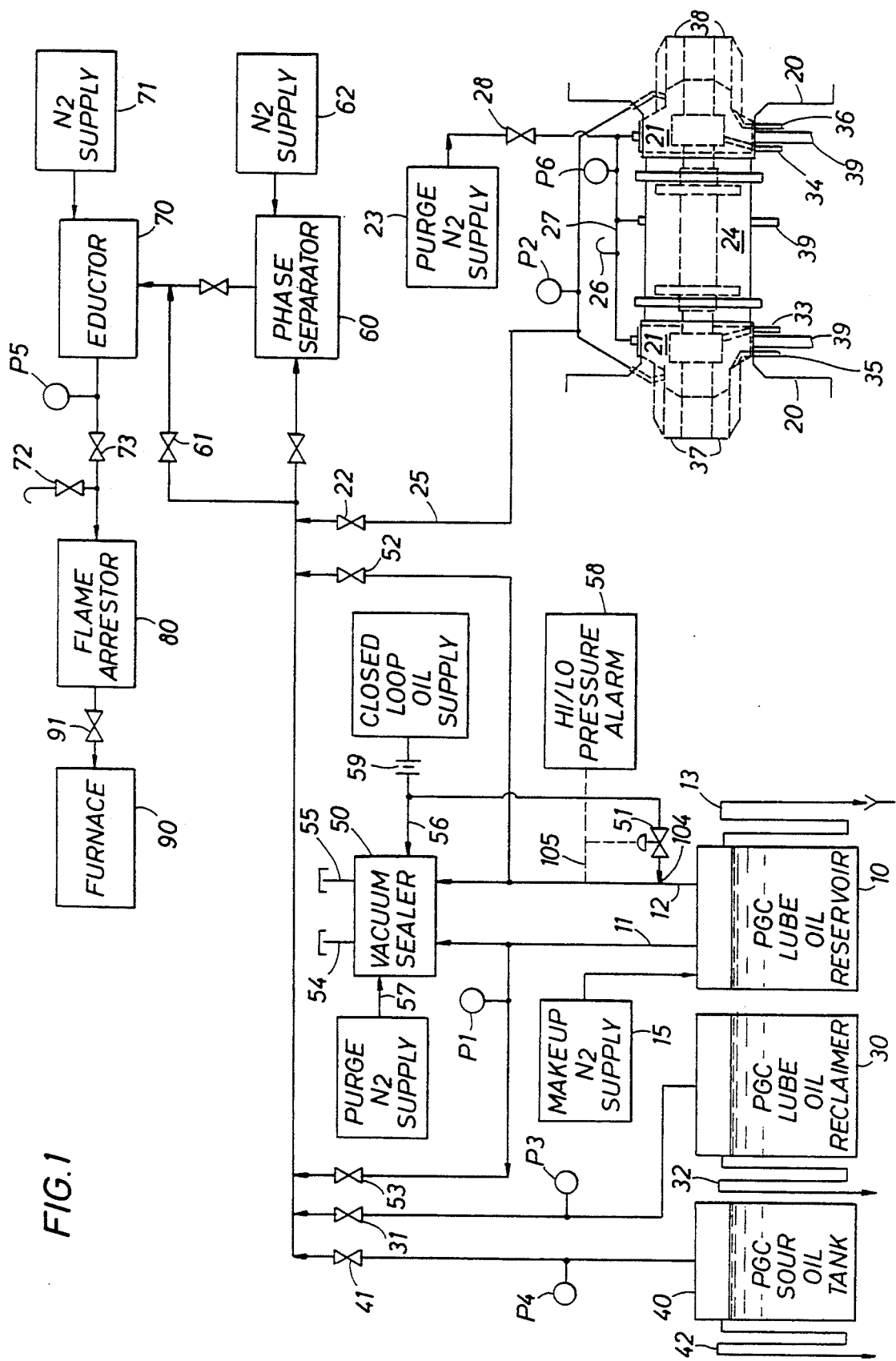
FIG. 1 is a block diagram of the Process Gas Compressor Train Fugitive Emissions Recovery System (FERS).

Referring now to FIG. 1, the Process Gas Compressor Train Fugitive Emissions Recovery System is comprised of the vacuum sealer 50, a phase separator 60, an eductor 70, a pressure dump valve 51, numerous self-contained regulators (not shown), a high/low pressure alarm 58 and two pressure recorders (not shown). All recovered process gas is routed through flame arrestor 80 to furnace 90 for combustion.

A single eductor 70 draws a nominal vacuum of 2" of water column vacuum on the PGC lube oil reservoir 10, the bearing housings 21 of each compressor case 20, the PGC lube oil reclaimer 30, and the sour oil holding tank 40. This vacuum is the driving force that suctions accumulated process gas compressor seal leakage from the lube oil reservoir 10 through gate valves 52, 53, the bearing housings 21 of each compressor case 20 through gate valve 22, the lube oil reclaimer 30 through gate valve 31, and the sour oil holding tank 40 through gate valve 41. Ideally, the lube oil reservoir 10, the bearing housing vent header 25, the lube oil reclaimer 30, and the sour oil holding tank 40 should all be under a vacuum of e.g. 2" of water column vacuum as indicated by local pressure gauges P1, P2, P3, and P4, respectively. In order to achieve the proper vacuum, the flow rate of the nitrogen supply 71 to the eductor 70 should be manually adjusted. To obtain the same reading on all local pressure gauges P1, P2, P3, and P4, it may be necessary to adjust the gate valves 52, 53, 22, 31, and 41 on the vent lines from the lube oil reservoir 10, the PGC bearing housings 21, the lube oil reclaimer 30, and sour oil holding tank 40, respectively.

The mixture of process gas and nitrogen is discharged by the eductor 70 through discharge valve 73 at a pressure as indicated by pressure gauge P5 and routed to furnace 90 through flame arrestor 80 for combustion. Three such furnace 90 and flame arrestor 80 are utilized by Assignee but only one is shown for clarity. The eductor 70 discharge piping is sized such that the recovered process gas and nitrogen mixture may be routed to one, two, or all three of these furnaces 90 simultaneously. Normally, the gas mixture discharged by the eductor 70 should be routed to two furnaces 90.

In order for the process gas and nitrogen mixture to be properly combusted, the furnace 90 should be in operation. Although the gas mixture discharged by the eductor 70 does contain some hydrocarbon, under normal operating conditions it will not contain enough oxygen to support combustion. As such, the gas mixture will not be flammable until after it is mixed with air in each furnace 90 fire box.

The Process Gas Compressor Train Fugitive Emissions Recovery System is, like any system that operates at a slight vacuum, susceptible to air intrusion. One of the most important aspects of operating this system is to prevent air intrusion. All bleeders, drains, vents, and other possible air intrusion points must be sealed. Further, the system should always operate at minimum vacuum to lessen the possibility of air intrusion.

In the event that the gas mixture discharged by the eductor 70 does contain enough oxygen to support combustion, the gas velocity through the flame arrestor 80 is more than sufficient to prevent flashback. A flame arrestor 80 is installed upstream of each furnace 90 as additional protection against flashback.

Furnace Operation

Should a furnace 90 automatically shut down while the process gas and nitrogen mixture is being routed to it, the gas to this furnace 90 should be blocked in and routed to one of the other furnaces 90 in operation for combustion. Until the gas can be blocked in, the furnace draft created by the induced draft fan or steam ring is sufficient to prevent the accumulation of gas in the furnace 90 fire box.

If all three furnaces 90 shut down automatically or are out of service, the block valve 72 on the elevated vent immediately downstream of the eductor 70 should be opened and the block valve 91 on the gas line to the furnace 90 should be closed.

Vacuum Sealer - Normal Operating Condition

Figure 2:
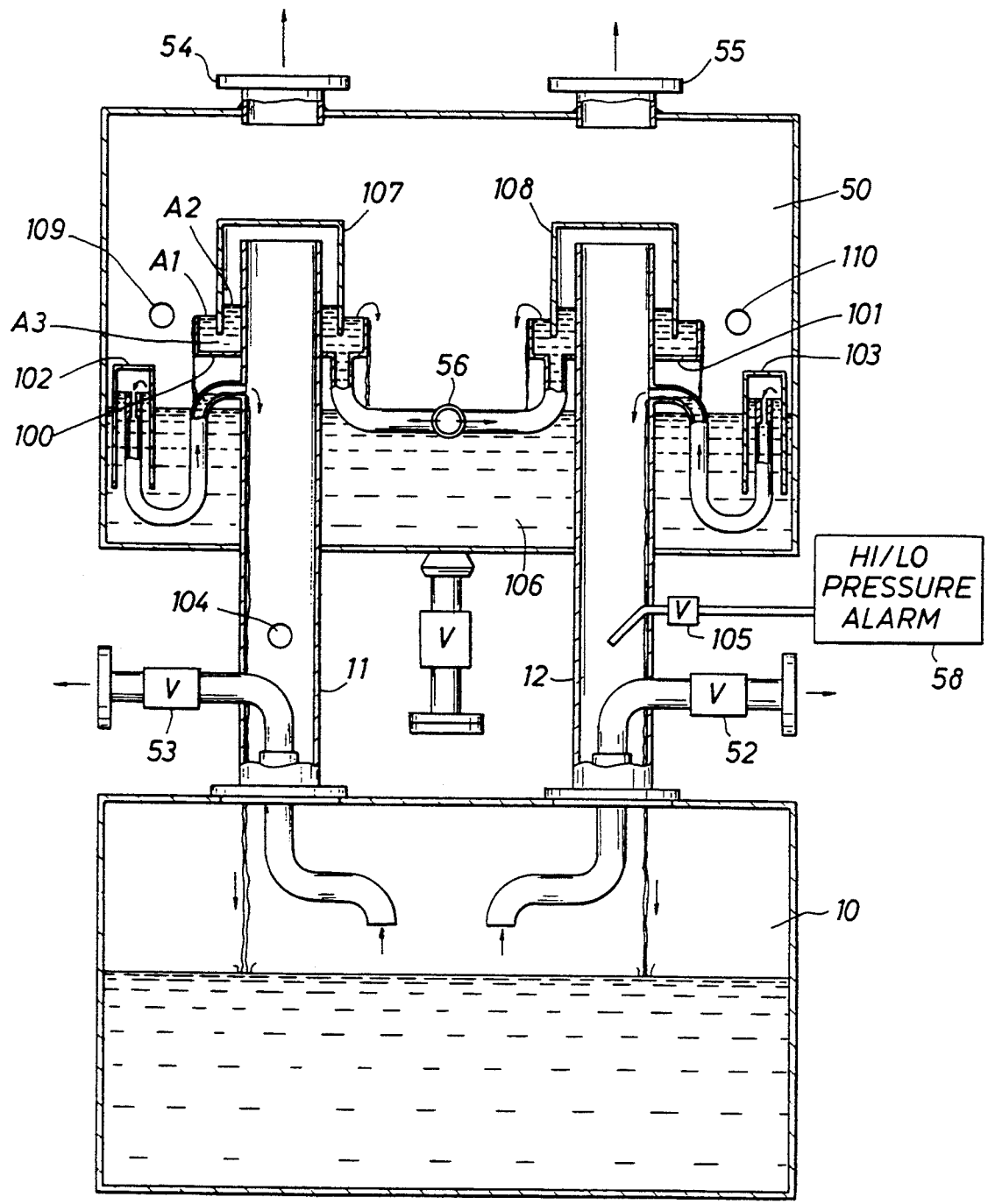
FIG. 2 is a schematic representation, partly in section, of the vacuum sealer of the invention in normal operation.

Referring now also to FIG. 2, the normal operating condition of the vacuum sealer 50 will be described. The vacuum sealer 50 is physically mounted above the lube oil reservoir 10 and is sealingly connected to the lube oil reservoir by risers 11, 12 which open into the upper portion of vacuum sealer 50. A pair of atmospheric vents 54, 55 is provided on top of the vacuum sealer 50. A liquid seal is provided by seal pans 100, 101, which sealingly surround risers 11, 12, in combination with inverted partition caps 107, 108 which are caps fixedly placed over the top of risers 11, 12, the open end of the caps 107, 108 extending downwardly into the pans 100, 101 for a desired distance. The seal pans 100, 101 have openings in the bottoms thereof for communicating with lube oil supply line 56 for filling. Inside the vacuum sealer 50, the liquid seal is created by filling seal pans 100, 101 with a continuous supply of lube oil from a closed-loop lubrication system via lube oil supply line 56. The purpose of the liquid seal is to keep process gas inside the lube oil reservoir 10 while keeping air out. A restriction orifice 59 (FIG. 1) limits the lube oil supplied to the seal pans 100, 101 to approximately one gallon per minute. The excess lube oil that overflows the seal pans 100, 101 falls to the bottom of the vacuum sealer 50 where it is drained back to the lube oil reservoir 10 by passing through the lube oil drain traps 102, 103. The lube oil drain traps 102, 103 prevent air from entering the lube oil reservoir 10 while it is under a vacuum and automatically maintain a constant level of lube oil 106 in the bottom of the vacuum sealer 50.

Ideally, the vacuum sealer 50 operates with the lube oil reservoir 10 under a vacuum of e.g. 2" of water column vacuum as indicated by a local pressure indicator P1. Under this condition, accumulated process gas can be suctioned from the reservoir 10 without air intrusion into the reservoir 10.

Due to the physical configuration of the inverted partition caps 107, 108 and seal pans 100, 101 inside the vacuum sealer 50, a water column vacuum of an amount greater than X inches (the distance from the top of the riser 11, 12 to the bottom of the inverted partition cap 107, 108) will blow the liquid seal and allow air to be sucked into the lube oil reservoir 10. Likewise, a pressure greater than Y inches (the distance from the top of the seal pan 100, 101 to the bottom of the inverted partition cap 107, 108) of water column pressure will also blow the liquid seal and allow process gas to be emitted by the atmospheric vents 54, 55 on top of the vacuum sealer 50. These upset conditions will be subsequently described with reference to FIGS. 3 and 4.

In order to provide adequate lube oil reservoir overpressure protection, flow passage areas A1, A2, and A3 (refer to FIG. 2) are dimensioned as necessary to provide adequate flow area in the event of a major PGC seal failure. A1 is the circumferential flow passage area located between the inside diameter of seal pan 100, 101 and the outside diameter of inverted partition cap 107, 108. A2 is the circumferential flow passage area located between the inside diameter of inverted partition cap 107, 108 and the outside diameter of riser 11, 12. A3 is the circumferential flow passage area as defined by the vertical distance between the inside bottom of the seal pan 100, 101 and the bottom edge of the inverted partition cap 107, 108.

Purge nitrogen 57 is injected into the upper half of the vacuum sealer 50 via inlet connections 109, 110 to minimize the oxygen concentration inside the vacuum sealer 50 and to prevent humid air from entering the two atmospheric vents 54, 55 located on top of the vacuum sealer 50. Keeping the humid air out of the vacuum sealer 50 is necessary in order to prevent contaminating the lube oil supply with water. The purge nitrogen 57 pressure is a nominal 4 psig and is controlled by a regulator (not shown). The flow of purge nitrogen 57 into the upper half of the vacuum sealer 50 should be no more than is sufficient to prevent air from entering the two atmospheric vents 54, 55.

A phase separator 60 ( FIG. 1 ) removes any entrained liquid from the process gas that is suctioned from the lube oil reservoir 10, the bearing housings 21 of each compressor case 20, the lube oil reclaimer 30, and the sour oil holding tank 40. Periodically, the phase separator 60 should be removed from service by opening the bypass line valve 61 and then blocking in the phase separator 60. The accumulated liquid contents of the phase separator 60 is then blown out to a clean oil sewer (not shown) with nitrogen 62. These steps are then reversed to place the phase separator 60 back in service.

Caution must be taken not to exceed the normal liquid level of the lube oil reservoir 10. Otherwise, lube oil, instead of process gas, could be suctioned from the reservoir 10 and deposited in the furnace firebox 90. An overfill trap 13 is provided to prevent overfilling. The closed loop lubrication system comprises a pump (not shown) which draws lube oil from the reservoir 10 and provides oil, under pressure, to the seals 37, 38, via inlet lines 35 and 36, to the bearings B, via inlet lines 33, 34 and to seal pans 100, 101 via inlet line 56. Oil returns to the reservoir 10 via drain line 39 and the risers, 11, 12.

Vacuum Sealer - Upset Conditions

Figure 3:
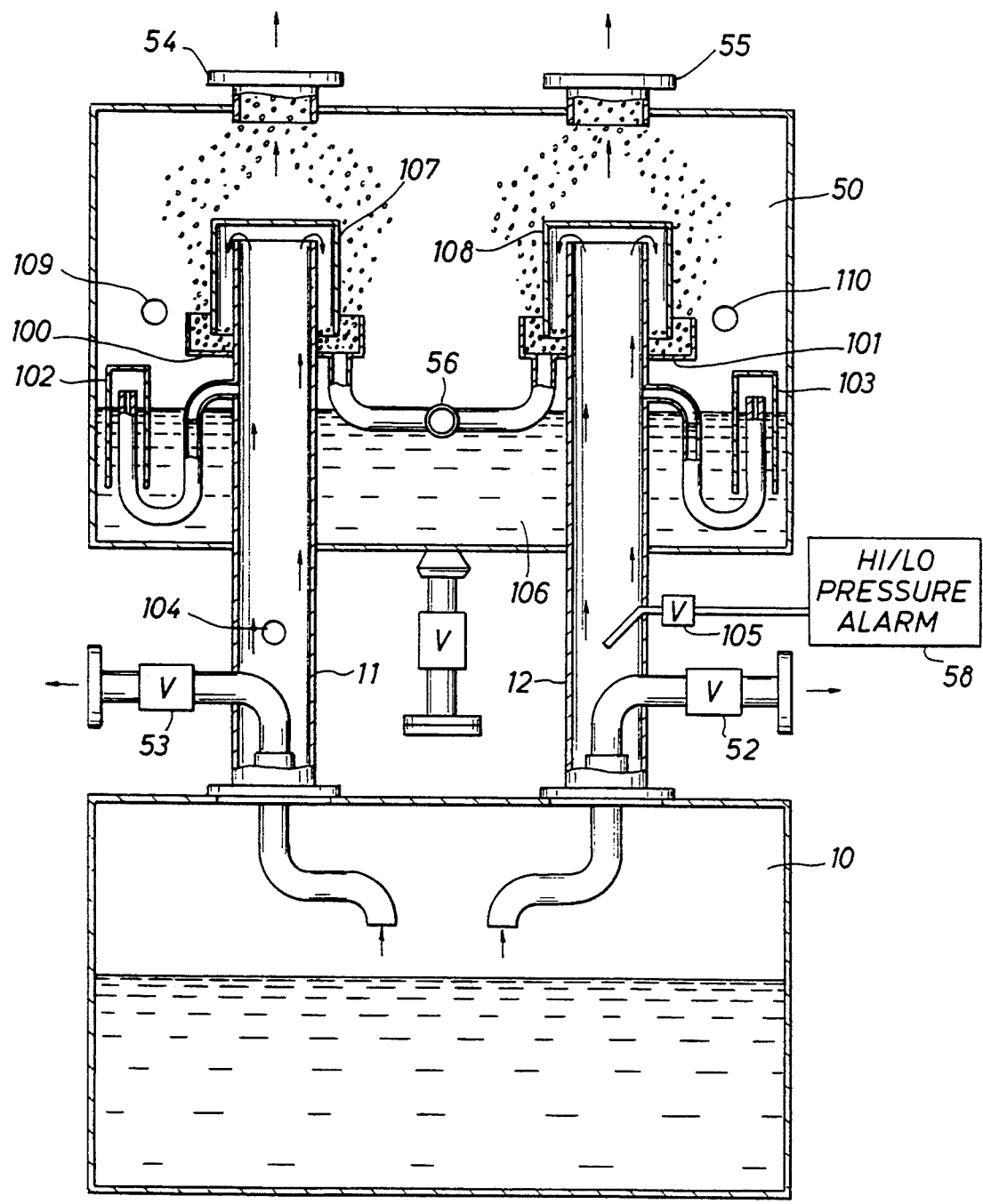
FIG. 3 is a schematic representation, partly in section, of the vacuum sealer of the invention operating with a loss of vacuum in the PGC lube oil reservoir.

As previously stated, a pressure inside the lube oil reservoir 10 that exceeds Y inches (refer to FIG. 2 ) of water column pressure will blow the liquid seal and hence, process gas will be emitted by the atmospheric vents 54, 55 on top of the vacuum sealer 50. This condition (after dump valve 51 has automatically opened) is shown in FIG. 3. Any positive pressure in the lube oil reservoir 10 has also been demonstrated to inhibit the drainage of lube oil from the PGC bearing housings 21.

To prevent any positive pressure from occurring inside the lube oil reservoir 10, a pressure dump valve 51 will automatically open when the vacuum inside the reservoir 10 is less than ¼" of water column vacuum. When the pressure dump valve 51 opens, the seal pans 100, 101 are drained of the lube oil they would normally contain and the continuous supply of lube oil from lube oil supply line 56 to the seal pans 100, 101 is rerouted from the seal pans 100, 101 directly to the lube oil reservoir 10 via pressure dump valve 51 and inlet connection 104. Without the liquid seal in the seal pans 100, 101, process gas will escape to the atmosphere from the reservoir 10 via the risers 11, 12, through the empty seal pans 100, 101 and out through the atmospheric vents 54, 55. This scenario will occur: (1) when the nitrogen supply 71 to the eductor 70 is blocked in; (2) when the eductor discharge valve 73 and/or suction valves 52, 53, 22, 31, and 41 are closed; or (3) in the event of a major seal failure on one of the compressor cases 20. If any of these events occur, they will be sensed at transmitter connection 105 and a high pressure alarm 58 will alert the operator when the reservoir 10 vacuum is less than ¼" water column vacuum. It is important to note that any time the FERS is out of service, process gas containing benzene and butadiene will escape to the atmosphere via the atmospheric vents 54, 55 on top of the vacuum sealer 50. As such, it will be necessary to wear fresh air when performing work around the PGC lube oil reservoir 10.

Figure 4:
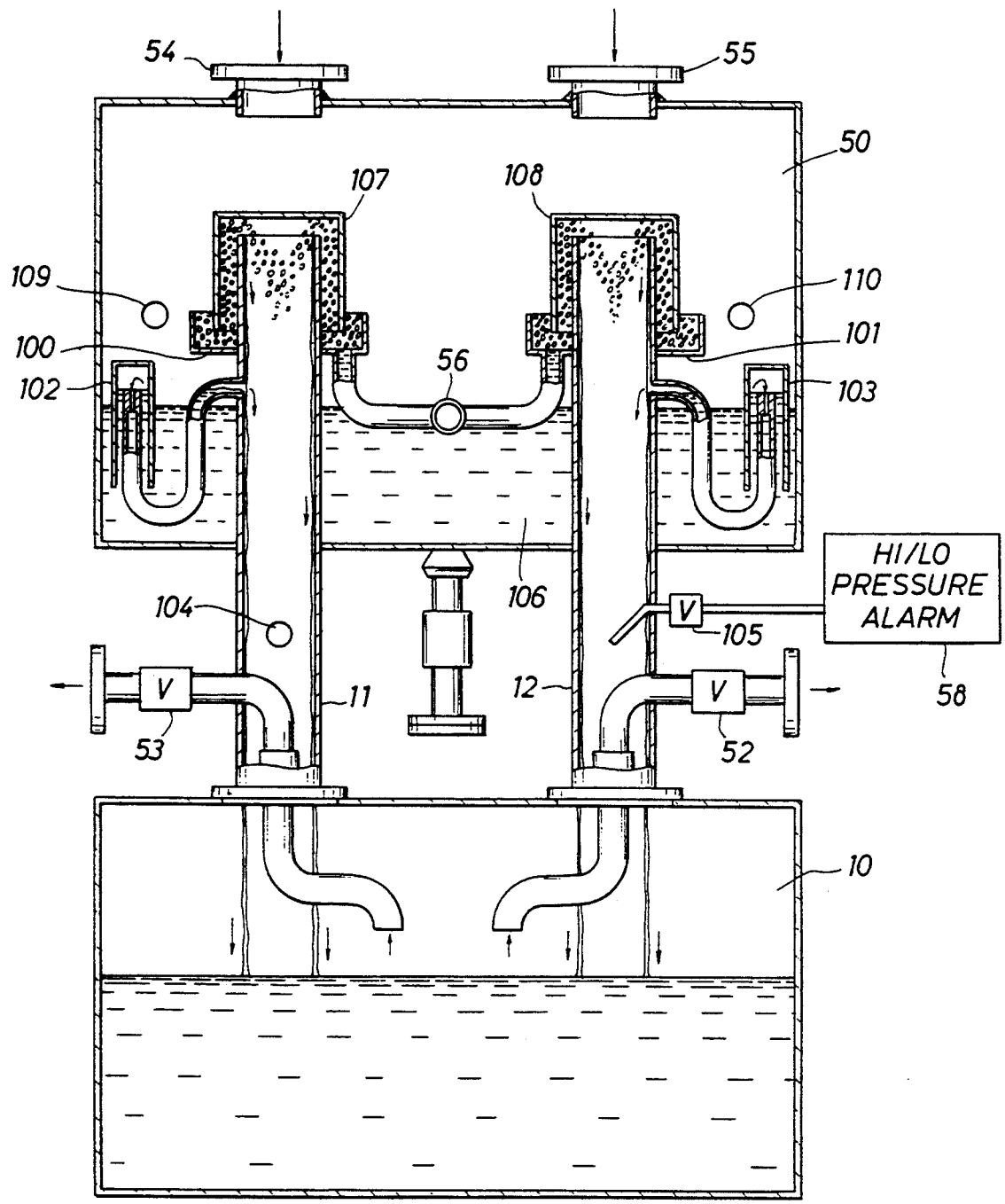
FIG. 4 is a schematic representation, partly in section, of the vacuum sealer of the invention operating with the lube oil reservoir under too much vacuum.

Likewise, and referring now to FIG. 4, a vacuum inside the lube oil reservoir 10 that exceeds X inches (refer to FIG. 2) of water column vacuum will also blow the liquid seal in the seal pans 100, 101 by causing the oil in the seal pans 100, 101 to rise up in the space between the inverted partition caps 107, 108 and the risers 11, 12 and overflow into and down the risers 11, 12 into lube oil reservoir 10. Without this liquid seal, air and nitrogen will intrude into the lube oil reservoir 10 via vacuum sealer 50 and vents 54, 55.

A potentially flammable mixture of air and hydrocarbon could be formed in the lube oil reservoir 10 if air is allowed inside the reservoir 10. For this reason, dual regulators (not shown) provide makeup nitrogen 15 to the reservoir 10. These regulators are normally closed until the reservoir 10 vacuum exceeds 2" of water column vacuum. At this point, these regulators will supply makeup nitrogen 15 on demand to ensure that the reservoir 10 vacuum never exceeds X inches of water column vacuum. This supply of makeup nitrogen 15 will also dampen fluctuations in the reservoir 10 vacuum. If the vacuum inside the reservoir 10 approaches X inches of water column vacuum, this will be sensed at pressure transmitter connection 105 and a low pressure alarm 58 will alert the operator. The operator should then immediately decrease the nitrogen supply 71 to the eductor 70 until the vacuum inside the reservoir 10 is reduced to approximately 2" of water column vacuum.

Bearing Housing Vent Header

As mentioned earlier, and referring back to FIG. 1, a vacuum of e.g. 2" of water column vacuum is drawn on the bearing housing vent header 25 through gate valve 22 to suction leaking process gas from the bearing housings 21 on each compressor case 20. A nitrogen purge 23 of 5 psig, indicated by a local pressure gauge P6 is provided by means of a regulator (not shown) to the bearing 21 and coupling 24 housings for each compressor case 20. This nitrogen purge 23 will allow both the bearing 21 and coupling 24 housings to breathe which in turn will permit the circulating lube oil in the bearing housings 21 to drain unrestricted to the lube oil reservoir 10 via return lube oil piping 39. Nitrogen 23 is used in place of air to avoid contaminating the lube oil reservoir 10 with water and to keep the oxygen content in the FERS to a minimum to decrease the likelihood of a flammable hydrocarbon mixture inside the reservoir 10. In the event that this nitrogen purge 23 fails, gooseneck atmospheric vent 26 on the nitrogen purge header 27 will prevent the bearing housings 21 from being under a vacuum which in turn allows the circulating lube oil in the bearing housings 21 to drain unrestricted through return piping 39.

It is important that the nitrogen purge 23 to the bearing 21 and coupling 24 housings be maintained. A slight positive nitrogen outflow through the atmospheric gooseneck vent 26 on the nitrogen purge header 27 is a good indicator that adequate nitrogen 23 is being supplied to the bearing 21 and coupling 24 housings. On the other hand, a light sheet of paper that attaches to the gooseneck vent 26 by suction indicates a lack of purge nitrogen 23 and the presence of a vacuum. A vacuum in the bearing 21 or coupling 24 housings will restrict the drainage of lube oil from the bearing housings 21. As a result, the bearing housings 21 will quickly flood which in turn will cause the bearings B to overheat and lube oil to leak from the bearing housings 21 into the coupling housing 24. Hence, the valve 28 on the nitrogen purge header 27 to the bearing 21 and coupling 24 housings should be kept opened at all times while the PGC is on-line.

The coupling housings 24 also require adequate purge nitrogen 23 to remove the heat generated by the couplings turning at high speed with close clearance to the stationary coupling housing 24. The pumping action of the coupling will pull the majority of the nitrogen purge 23 to the coupling housing 24. Most of the nitrogen purge 23 entering the coupling housing 24 will be drawn to the lube oil reservoir 10 via the return lube oil piping 39.

Lube oil from the closed-loop lubrication system is supplied to the compressor bearings B via lube oil supply lines 33, 34. Seal oil is likewise supplied to the compressor seals 37, 38 via seal oil supply lines 35, 36. Oil from the bearing 21 and coupling 24 housings is returned to the lube oil reservoir 10 by the return lube oil piping 39.

In like manner, the system can be used to remove fugitive emissions from a lube oil reclaimer and a sour oil holding tank. A drain trap 32 is provided to prevent the lube oil reclaimer water tank 30 from being overfilled and to prevent air intrusion into the lube oil reclaimer water tank 30 while this tank 30 is under a vacuum of 2" of water column vacuum. This drain trap 32 must be kept full of water in order to prevent air from entering the tank 30.

Similar to the lube oil reclaimer water tank 30, a drain trap 42 is provided to prevent overfilling the sour oil holding tank 40. This drain trap 42 must be kept full of lube oil in order to prevent air from entering the sour oil holding tank 40 while this tank 40 is under a vacuum of 2" of water column vacuum.

What is claimed is:

1. A system for capturing fugitive emissions from rotating machinery comprising:

a machine adapted to rotate within a housing on an axial shaft, said shaft having seal means for sealing said shaft from said housing and having a bearing within a bearing housing, said bearing being mounted on said shaft for enabling rotation of said axial shaft about its axis;

means for supplying lubricating oil to said seal means;

means for supplying lubricating oil to said bearing;

means for draining said lubricating oils from said seal means and said bearing housing;

a reservoir for receiving said drained lubricating oils;

a vacuum sealer located above said reservoir and connected thereto by tubular riser means, said riser means extending into said vacuum sealer;

liquid seal means located within said vacuum sealer situated atop and enclosing the opening of said riser means, said liquid seal means comprising a seal pan filled with lubricating oil for sealingly surrounding said riser means, and a partition cap inverted over the opening of said riser means and opening into said seal pan into the oil therein for a fixed distance above the bottom of said pan and below the top of said pan;

means for creating a negative pressure within said riser means, within said bearing housing means and within said reservoir for withdrawing contaminants therefrom; and furnace means for receiving and destroying said contaminants.

2. The apparatus of claim 1 further comprising means for keeping said seal pan filled with lubricating oil.

3. The apparatus of claim 2 further comprising a control means for preventing a positive pressure inside said reservoir.

4. The apparatus of claim 3 wherein said control means is a supply of nitrogen for injection into said reservoir when the vacuum in said reservoir falls below a specified limit.

5. The apparatus of claim 1 wherein said lubricating oil is supplied from a closed-loop lubrication system.

6. The apparatus of claim 1 further including means for applying a positive pressure to said bearing housing.

7. The apparatus of claim 1 further comprising means for applying a positive pressure in the upper portion of said vacuum sealer.

8. The apparatus of claim 1 further comprising means for preventing contamination of said lubricating oil with water.

9. A system for capturing fugitive emissions from rotating machinery comprising:

a machine adapted to rotate within a housing on an axial shaft, said shaft having seal means for sealing said shaft from said housing and having a bearing within a bearing housing, said bearing being mounted on said shaft for enabling rotation of said axial shaft about its axis;

means for supplying lubricating oil to said seal means;

means for supplying lubricating oil to said bearing;

means for draining said lubricating oils from said seal means and said bearing housing;

a reservoir for receiving said drained lubricating oils;

a vacuum sealer located above said reservoir and connected thereto by tubular riser means, said riser means extending into said vacuum sealer;

liquid seal means located within said vacuum sealer situated atop and enclosing the opening of said riser means, said liquid seal means comprising a seal pan filled with lubricating oil for sealingly surrounding said riser means, and a partition cap inverted over the opening of said riser means and opening into said seal pan into the oil therein for a fixed distance above the bottom of said pan and below the top of said pan; and means for creating a negative pressure within said riser means, within said bearing housing means and within said reservoir for withdrawing contaminants therefrom.

10. The apparatus of claim 9 further comprising means for keeping said seal pan filled with lubricating oil.

11. The apparatus of claim 10 further comprising a control means for preventing a positive pressure inside said reservoir.

12. The apparatus of claim 11 wherein said control means is a supply of nitrogen for injection into said reservoir when the vacuum in said reservoir falls below a specified limit.

13. The apparatus of claim 9 wherein said lubricating oil is supplied from a closed-loop lubrication system.

14. The apparatus of claim 9 further including means for applying a positive pressure to said bearing housing.

15. The apparatus of claim 9 further comprising means for applying a positive pressure in the upper portion of said vacuum sealer.

16. The apparatus of claim 9 further comprising means for preventing contamination of said lubricating oil with water.

* * * * *